(12) United States Patent
Mehfuz et al.

(10) Patent No.: US 11,443,765 B2
(45) Date of Patent: *Sep. 13, 2022

(54) COMPACT MODE CONVERTER HAVING FIRST AND SECOND STRAIGHT PORTIONS FOR HEAT-ASSISTED MAGNETIC RECORDING DEVICE

(71) Applicant: Seagate Technology LLC, Fremont, CA (US)

(72) Inventors: Reyad Mehfuz, Londonderry (GB); Aidan Dominic Goggin, Donegal (GB); Pierre Asselin, Richfield, MN (US); Christopher Neil Harvey, Londonderry (GB)

(73) Assignee: Seagate Technology LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/221,945

(22) Filed: Apr. 5, 2021

(65) Prior Publication Data
US 2021/0225397 A1 Jul. 22, 2021

Related U.S. Application Data

(63) Continuation of application No. 16/433,467, filed on Jun. 6, 2019, now Pat. No. 10,971,179, which is a
(Continued)

(51) Int. Cl.
*G11B 5/48* (2006.01)
*G11B 5/31* (2006.01)
(Continued)

(52) U.S. Cl.
CPC .......... *G11B 5/4866* (2013.01); *G02B 6/1226* (2013.01); *G02B 6/1228* (2013.01);
(Continued)

(58) Field of Classification Search
None
See application file for complete search history.

(56) References Cited

U.S. PATENT DOCUMENTS

| 5,127,081 A | 6/1992 | Koren et al. |
| 7,898,759 B2 | 3/2011 | Matsumoto et al. |

(Continued)

*Primary Examiner* — K. Wong
(74) *Attorney, Agent, or Firm* — Mueting Raasch Group

(57) ABSTRACT

A write head includes an input coupler configured to receive light excited by a light source. A waveguide core is configured to receive light from the input coupler at a fundamental transverse electric ($TE_{00}$) mode. The waveguide core has a first straight portion. The waveguide core has a mode converter portion comprising a branched portion extending from the first straight portion. The mode converter portion is configured to convert the light to a higher-order ($TE_{10}$) mode, the mode converter portion spaced apart from the input coupler. The waveguide core has a second straight portion between the mode converter portion and a media-facing surface. The write head has a near-field transducer at the media-facing surface, the near-field transducer receiving the light at the $TE_{10}$ mode from the waveguide and directing surface plasmons to a recording medium in response thereto.

22 Claims, 13 Drawing Sheets

Related U.S. Application Data continuation of application No. 15/962,229, filed on Apr. 25, 2018, now abandoned.

(51) Int. Cl.
*G11B 5/60* (2006.01)
*G02B 6/122* (2006.01)
*G11B 5/00* (2006.01)

(52) U.S. Cl.
CPC ............ *G11B 5/314* (2013.01); *G11B 5/6088* (2013.01); *G11B 2005/0021* (2013.01)

(56) References Cited

U.S. PATENT DOCUMENTS

| | | |
|---|---|---|
| 8,170,389 B1 | 5/2012 | Komura et al. |
| 8,501,536 B2 | 8/2013 | Mooney et al. |
| 9,001,628 B1 | 4/2015 | Shi et al. |
| 9,099,130 B2 * | 8/2015 | Gubbins ................ G11B 5/314 |
| 9,099,139 B2 | 8/2015 | Gage et al. |
| 9,218,836 B2 | 12/2015 | Itagi et al. |
| 9,251,819 B2 | 2/2016 | Peng |
| 9,322,997 B2 | 4/2016 | Peng |
| 9,424,867 B2 | 8/2016 | Peng |
| 9,786,314 B1 | 10/2017 | Peng |
| 9,978,409 B2 | 5/2018 | Peng |
| 10,061,082 B1 | 8/2018 | Peng et al. |
| 10,061,088 B1 * | 8/2018 | Peng .................... G02B 6/3532 |
| 10,062,400 B1 | 8/2018 | Harvey et al. |
| 10,121,496 B1 | 11/2018 | Peng et al. |
| 10,170,140 B2 * | 1/2019 | Mehfuz .................. G02B 6/125 |
| 10,242,702 B1 * | 3/2019 | Peng .................... G11B 5/4866 |
| 10,249,326 B1 | 4/2019 | Peng |
| 10,431,253 B1 * | 10/2019 | McGurk ................. G11B 11/24 |
| 10,971,179 B1 * | 4/2021 | Mehfuz ................ G02B 6/1228 |
| 2011/0217003 A1 | 9/2011 | Gage et al. |
| 2011/0243176 A1 * | 10/2011 | Mooney ................. G11B 5/105 |
| | | 372/50.124 |
| 2014/0254335 A1 * | 9/2014 | Gage ...................... G11B 5/314 |
| | | 369/13.33 |
| 2015/0131415 A1 * | 5/2015 | Peng .................... G02B 6/1226 |
| | | 369/13.32 |

* cited by examiner

COMPACT MODE CONVERTER HAVING FIRST AND SECOND STRAIGHT PORTIONS FOR HEAT-ASSISTED MAGNETIC RECORDING DEVICE

RELATED PATENT DOCUMENTS

This application is a continuation of U.S. Ser. No. 16/433,467, filed on Jun. 6, 20219, which is a continuation of U.S. Ser. No. 15/962,229, filed on Apr. 25, 2018, now abandoned, to which priority is claimed and which are incorporated herein by reference in their entireties.

SUMMARY

Embodiments described herein are directed to a write head comprising an input coupler configured to receive light excited by a light source. A waveguide core is configured to receive light from the input coupler at a fundamental transverse electric ($TE_{00}$) mode. The waveguide core comprises a first straight portion. The waveguide core comprises a mode converter portion comprising a branched portion extending from the first straight portion. The mode converter portion is configured to convert the light to a higher-order ($TE_{10}$) mode, the mode converter portion spaced apart from the input coupler. The waveguide core comprises a second straight portion between the mode converter portion and a media-facing surface. The write head comprises a near-field transducer at the media-facing surface, the near-field transducer receiving the light at the $TE_{10}$ mode from the waveguide and directing surface plasmons to a recording medium in response thereto.

Embodiments are directed to an apparatus comprising an input coupler configured to receive light excited by a light source. A waveguide core is configured to receive light from the input coupler at a fundamental transverse electric ($TE_{00}$) mode. The waveguide core comprises an input portion configured to receive light from the input coupler. The waveguide core comprises a mode converter portion comprising a branched portion extending from the input portion. The mode converter portion is configured to convert the light to a higher-order ($TE_{10}$) mode. The mode converter portion is spaced apart from the input coupler. The waveguide core comprises an output portion between the mode converter portion and a media-facing surface. The write head comprises a near-field transducer at the media-facing surface, the near-field transducer receiving the light at the $TE_{10}$ mode from the waveguide and directing surface plasmons to a recording medium in response thereto.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure is generally related to an apparatus (e.g., a HAMR write head) having a waveguide that delivers light from an energy source (e.g., laser diode) to a near-field transducer (NFT). The NFT may also be referred to as a plasmonic transducer, plasmonic antenna, near-field antenna, nano-disk, nan-patch, nano-rod, etc. The light generates a surface plasmon field on the NFT, and the surface plasmons are directed out of a surface of the write head onto a magnetic recording medium. This creates a hotspot on the recording medium, lowering its magnetic coercivity and enabling a local magnetic field generated by a write pole to write data to the hotspot.

Figure 1A:
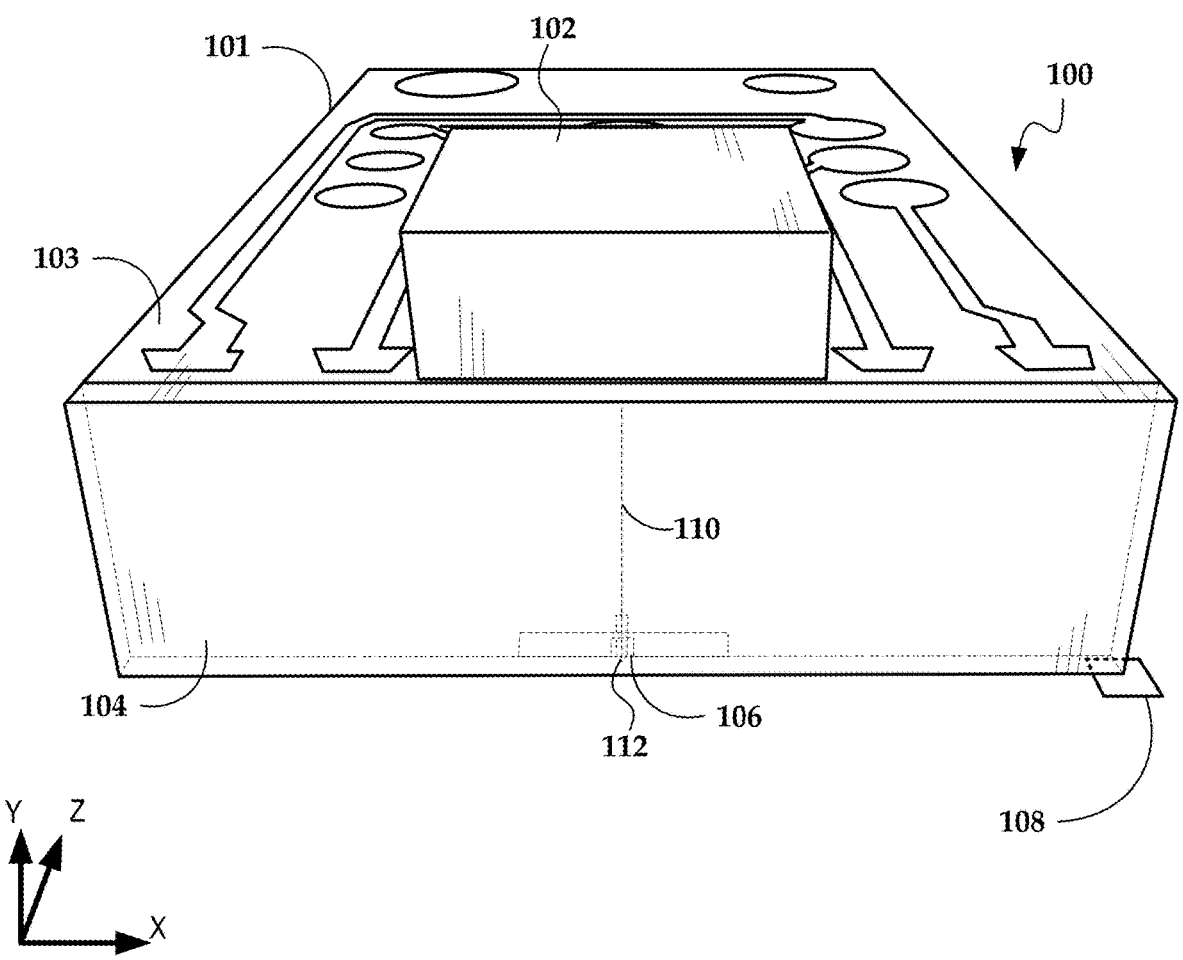
FIG. 1A-1D are a perspective views of hard drive sliders that includes a waveguide in accordance with embodiments described herein.

In reference to FIG. 1A, a perspective view shows a HAMR write head 100 according to an example embodiment. The write head 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write transducer 106, which is located near the media-facing surface 108. The energy is used to heat the recording media as it passes by the read/write transducer 106. Optical coupling components, such as a waveguide system 110, are formed integrally within the slider body 101 (near a trailing edge surface 104 in this example) and function as an optical path that delivers energy from the laser diode 102 to the recording media via a near-field transducer 112. The near-field transducer 112 is located near the read/write transducer 106 and causes heating of the media during recording operations. The near-field transducer 112 may be made from plasmonic materials such as gold, silver, copper, etc.

The laser diode 102 in this example may be configured as either an edge-emitting laser or surface-emitting laser. Generally, the edge-emitting laser, also called in-plane laser, emits light along the wafer surface of a semiconductor chip and a surface emitting laser emits light in a direction perpendicular to a semiconductor wafer surface. An edge-emitting laser may be mounted on the top surface 103 of the slider body 101 (e.g., in a pocket or cavity) such that the light is emitted in a direction perpendicular to the media-facing surface (along the negative y-direction in this view).

In some cases, the laser may be configured to have an offset light path. The offset light path may be used when a laser is not centered on the submount, for example. The light path may be offset in a range of about 3 μm to about 55 μm or in a range of about 4 μm to about 49.5 μm. To accommodate the offset laser, the light path may include an S-curve as shown in the read/write head 120 of FIG. 1B. In some cases, the light path may be tilted as shown in the read/write head 130 shown in FIG. 1C. The different shaped light paths may be accomplished by having a tilted waveguide and/or a waveguide having an s-curve.

Figure 1B:
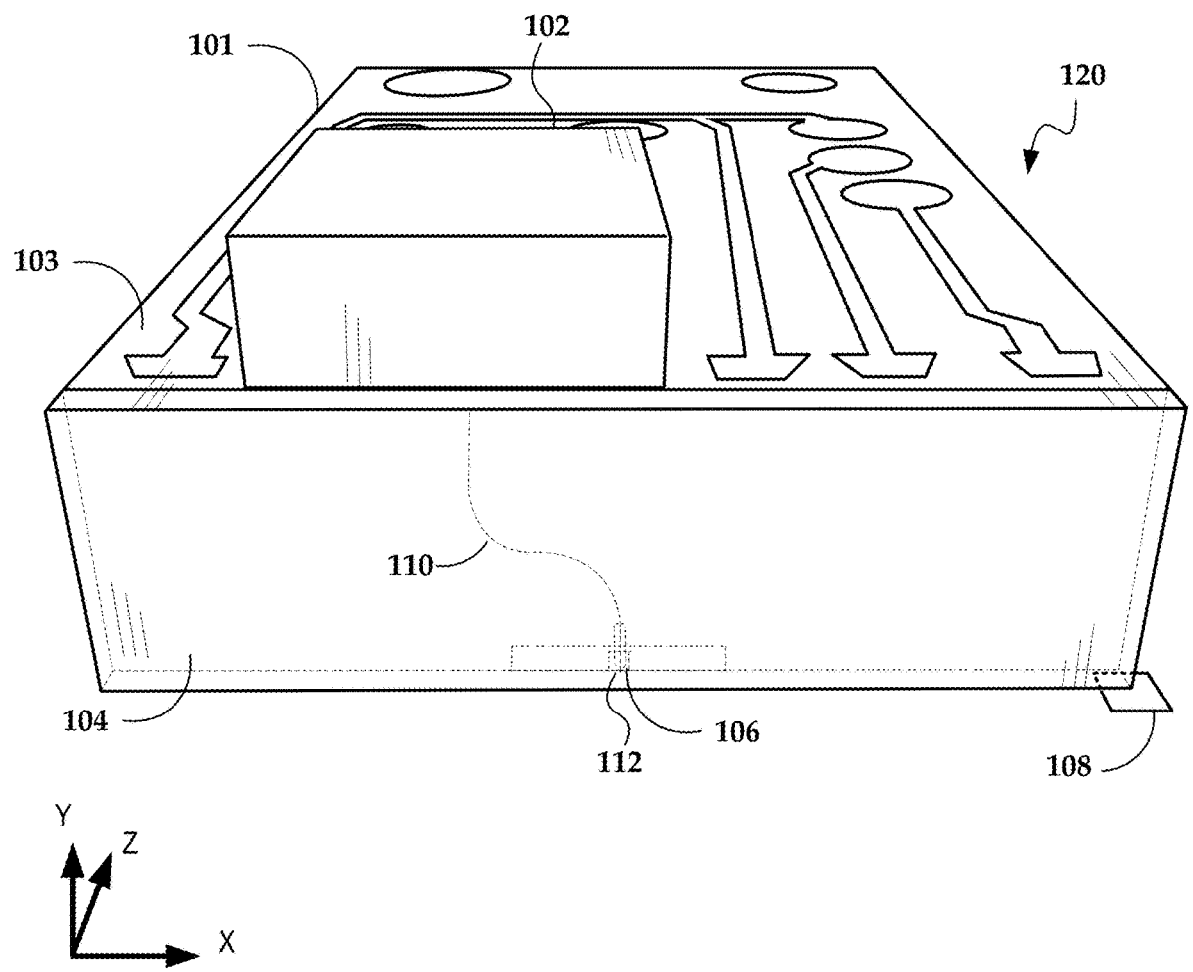
Figure 1C:
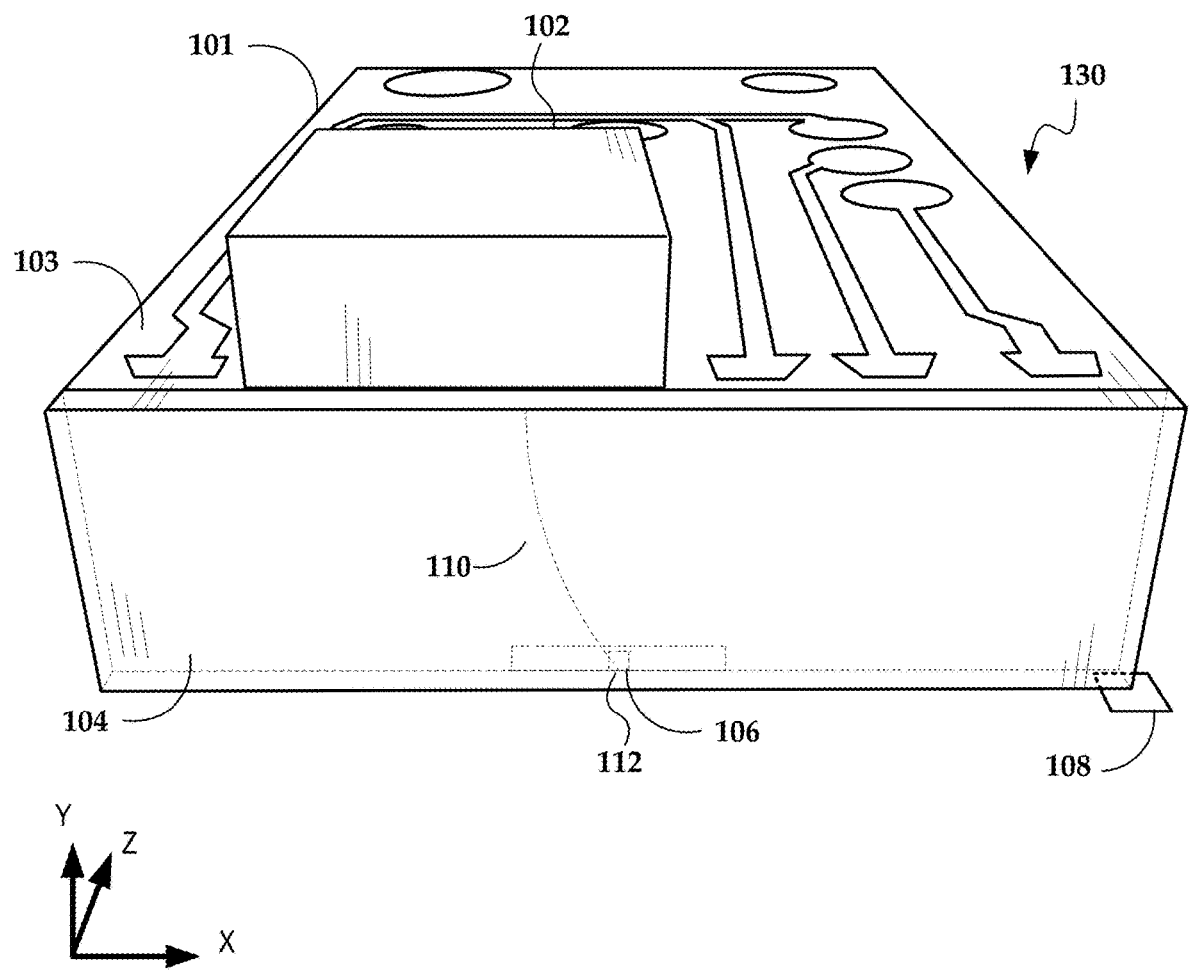
Figure 1D:
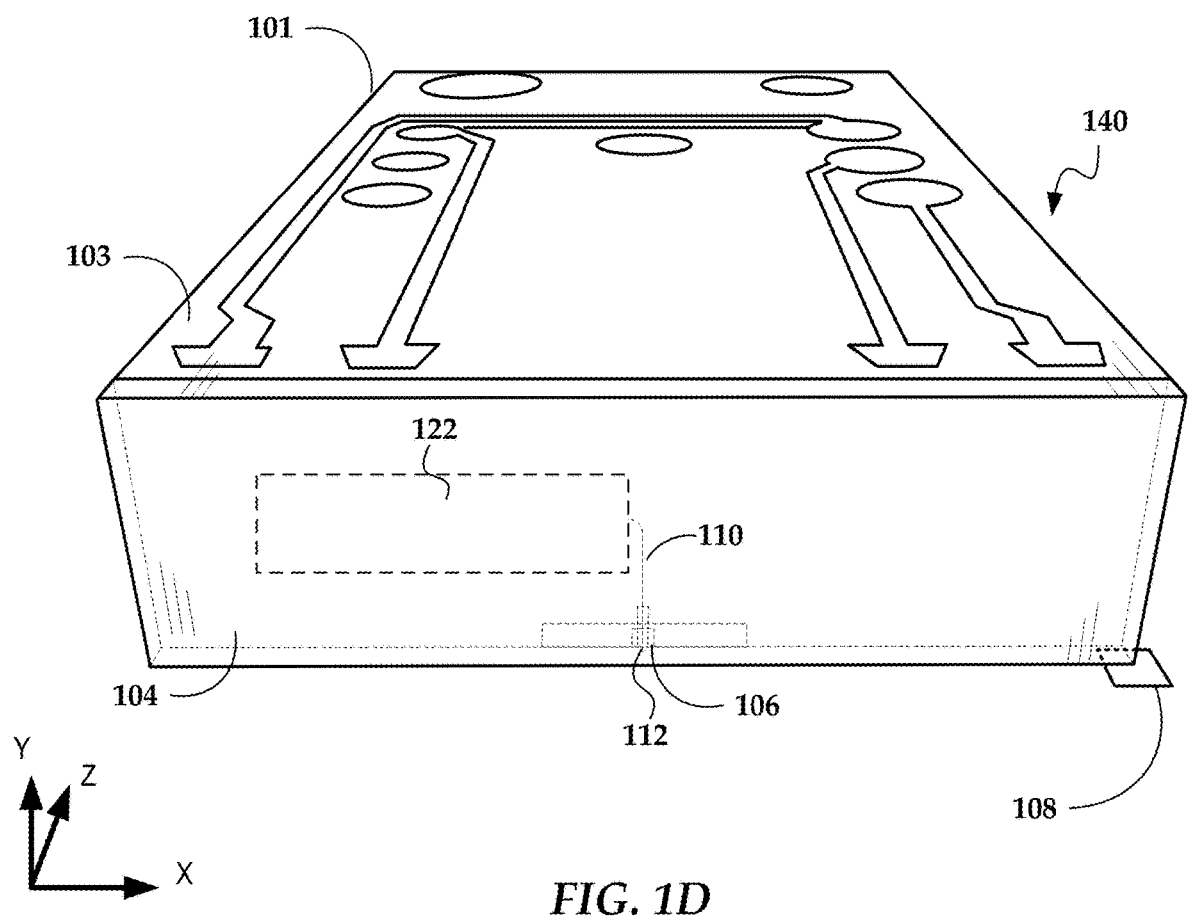

In the present disclosure, hard drive recording heads may use a different type of laser than what is shown in FIGS. 1A-1C. A read/write head 140 using this alternate approach is shown in FIG. 1D, wherein components are given the same reference numbers as analogous components in FIGS. 1A-1C. At least part of a semiconductor laser 122 or material to form a laser (e.g., epitaxial layer) is not self-supporting (e.g., not a separately packaged device) but is physically transferred to a target read/write head substrate that does contain already or will contain, after further processing, the other components of the read/write head (e.g., write coil and poles, reader stack) without the use of a separate or intermediate support during attachment. Carrying the semiconductor laser 122 with the read/write head substrate, without a separate or intermediate support substrate, can help to reduce the size and simplify the shape and connection methods, and it can also allow for the use of laser geometries and designs that are very different from simple edge-emitting cleaved facet lasers that have been proposed in the past.

In at least some cases, parts of the laser 122 (e.g., GaAs active region) are incompatible with epitaxial growth on the target substrate of a slider, which may be formed of a dielectric such as alumina. As such, the laser 122 cannot be formed using the same layer deposition processes used to form the magnetic and optical components that are integrated into the head. In embodiments described below, the laser may instead be formed on the substrate by transfer printing a thin, non-self-supporting crystalline layer (epitaxial layer), or a stack of such layers, from a growth substrate on which they were formed to a target substrate. Thereafter, the epitaxial layer and substrate are further processed (e.g., masked etched, further layers added) to form the integrated laser diode unit 122. This process of transferring non-self-supporting layers of epitaxial-growth-incompatible layers is referred to herein as On-Wafer Laser (OWL) process integration. This process may also be referred to as transfer printing, dry transfer printing, nano-printing, etc. Embodiments described herein may be implemented in an OWL system.

The waveguide system 110 discussed herein and shown in FIGS. 1A-1D may be applicable to any type of light delivery configuration. For example, a laser may be mounted on the trailing edge surface 104 instead of the top surface 103. In another configuration known as free-space light delivery, a laser may be mounted external to the write head 100, and coupled to the slider by way of optic fiber and/or waveguide. An input surface of the slider body 101 may include a grating or other coupling feature to receive light from the laser via the optic fiber and/or waveguide.

Figure 2:
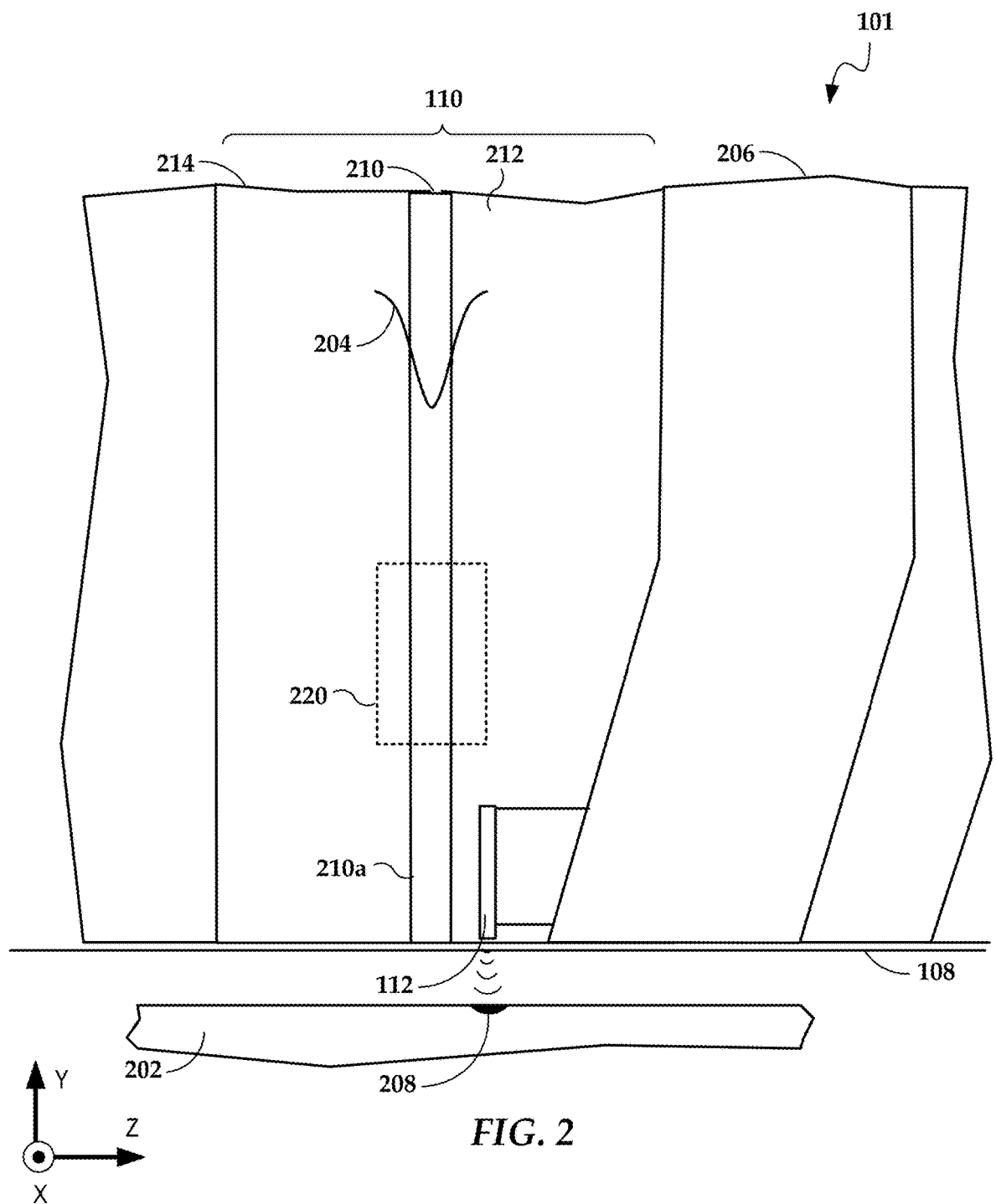
FIG. 2 is a cross-sectional view shows details of a HAMR apparatus in accordance with embodiments described herein.

In FIG. 2, a cross-sectional view illustrates portions of the slider body 101 near the near-field transducer 112 according to an example embodiment. In this view, the near-field transducer 112 is shown proximate to a surface of magnetic recording medium 202, e.g., a magnetic disk. The waveguide system 110 delivers electromagnetic energy 204 to the near-field transducer 112, which directs the energy 204 to create a small hot spot 208 on the recording medium 202. A magnetic write pole 206 causes changes in magnetic flux near the media-facing surface 108 in response to an applied current. Flux from the write pole 206 changes a magnetic orientation of the hot spot 208 as it moves past the write pole 206 in the downtrack direction (z-direction).

The waveguide system 110 includes a core layer 210 surrounded by cladding layers 212, 214. The core layer 210 and cladding layers 212, 214 may be made from dielectric materials such as $Al_2O_3$, SiOxNy, $SiO_2$, $Ta_2O_5$, $TiO_2$, ZnS, $Si_3N_4$, $Nb_2O_5$, AlN, $Hf_2O_3$, $Y_2O_3$, GaP, SiC, Si, $AlO_x$, etc. Generally, the dielectric materials are selected so that the refractive index of the core layer 210 is higher than refractive indices of the cladding layers 212, 214. This arrangement of materials facilitates efficient propagation of light through the waveguide system 110.

A first end of the core 210 (not shown) extends along the crosstrack direction (negative x-direction) where it is directly or indirectly coupled to a light/energy source. For example, a laser diode (e.g., OWL laser diode) may have an output facet that is coupled face-to-face with an end of the waveguide core 210. In other configurations, optical components such as lenses, mirrors, collimators, mode converters, etc., may be coupled between the waveguide core 210 and the light/energy source. In either case, the energy 204 coupled into the first end of the waveguide core 210 propagates to a second end 210a that is proximate the near-field transducer.

The waveguide system may include a mode converter 220. The mode converter may be configured to convert an input mode of light into a different mode or modes of light. In some cases, the mode converter 220 may be configured to receive a substantially transverse electric (TE) mode from the laser diode and be configured to convert the light into a higher order TM mode and/or a substantially transverse magnetic (TM). According to various embodiments, the mode converter 220 may be configured to receive fundamental TE mode ($TE_{00}$) light from the laser mode from the laser and be configured to convert the light into a higher order TE mode, e.g., $TE_{10}$, mode.

According to various embodiments described herein, the waveguide system includes a compact mode converter that is about 85% shorter than conventional mode converters. Using a compact mode converter allows the mode converter to be placed after the input coupler creating a more modular design. Moving the mode converter out of the input coupler frees up space that can be used to improve the input coupler performance. The compact mode converter may allow for additional optical elements in the light path such as an isolator and/or a mode filter, for example.

Figure 3:
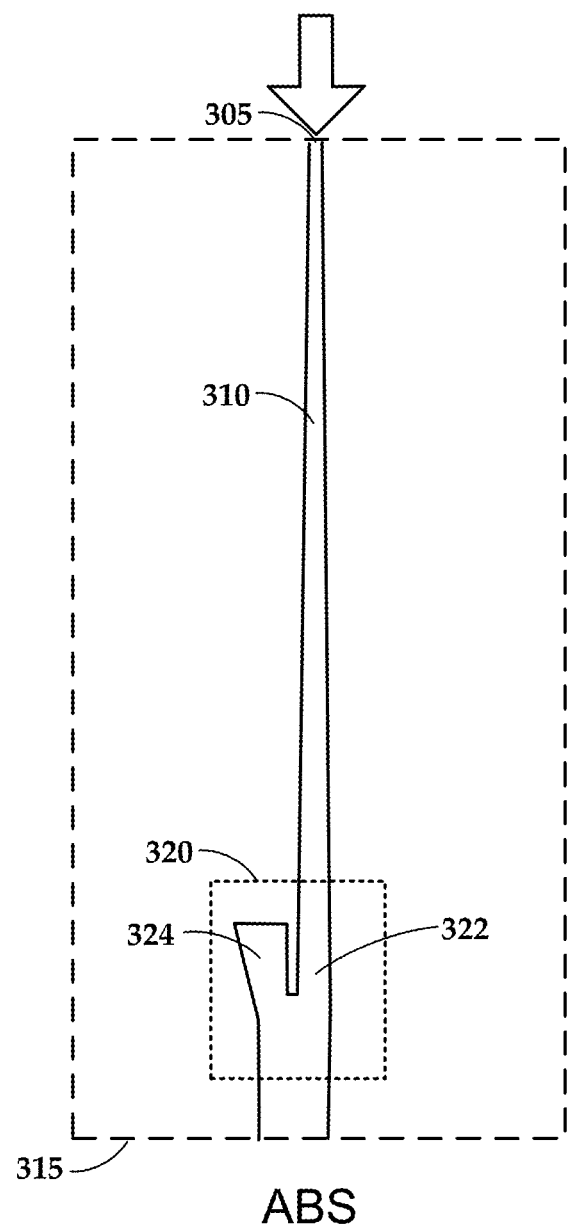
FIG. 3 illustrates a waveguide system having a mode converter in accordance with embodiments described herein.

FIG. 3 illustrates a waveguide system having a mode converter in accordance with embodiments described herein. According to various implementations, the waveguide system shown in FIG. 3 may be used in conjunction with a laser on slider configuration such as those shown in FIGS. 1A-1C. Light enters the waveguide 310 at input location 305 in a $TE_{00}$ mode and exits the waveguide core in a $TE_{10}$ mode at the ABS 315. The waveguide includes a main branch 322 configured to receive light. A secondary branch 324 of the waveguide 310 combines with the main branch 322 in a mode converter portion 320 of the waveguide 320. After the mode converter portion 320, the mode converted light, e.g., substantially $TE_{10}$, light exits the waveguide and is coupled to an NFT at the ABS 315.

Figure 4:
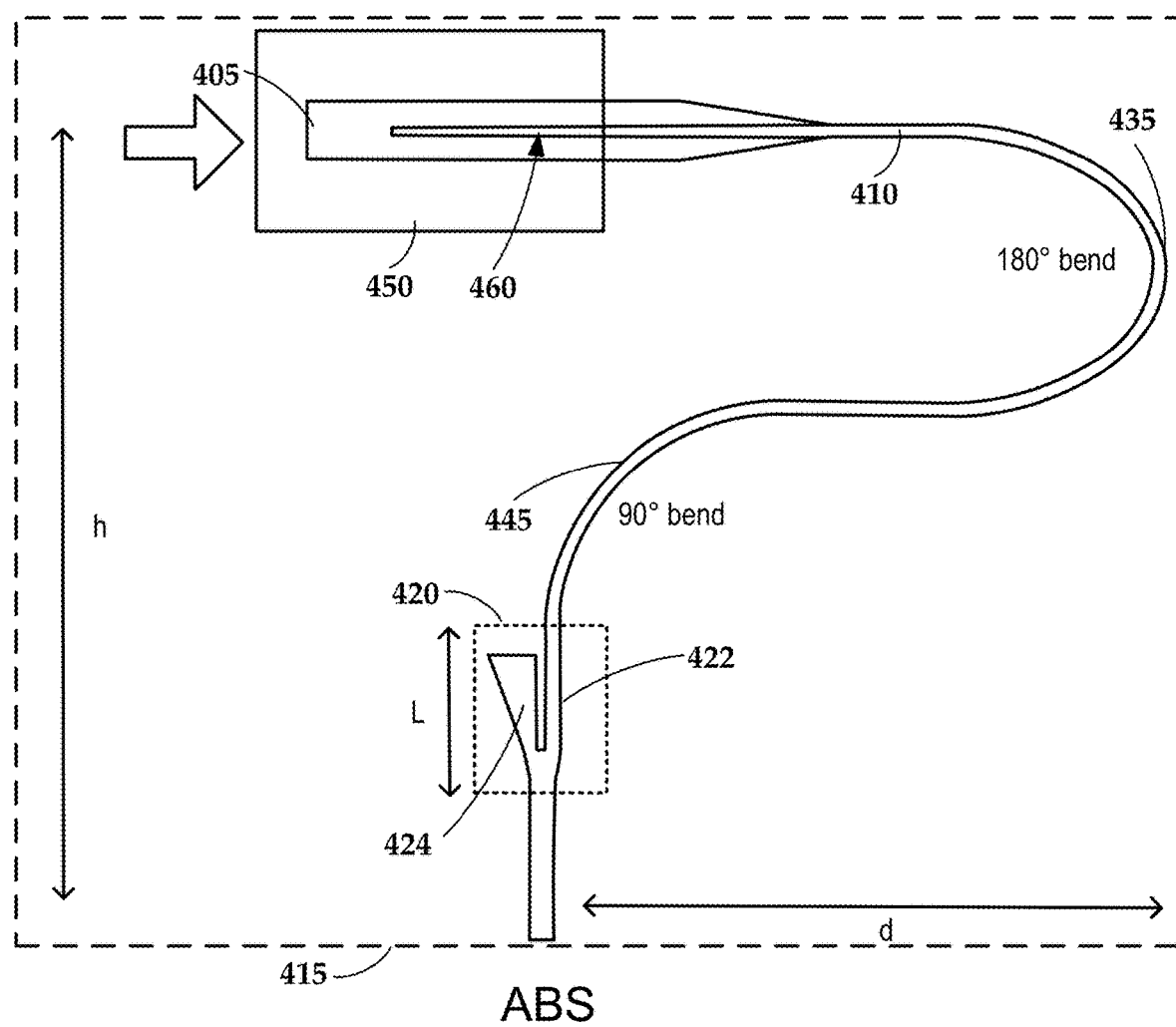
FIG. 4 illustrates a waveguide system having a mode converter in accordance with embodiments described herein.

FIG. 4 illustrates a waveguide system having a mode converter in accordance with embodiments described herein. The waveguide system shown in FIG. 4 may be used in conjunction with an on-wafer laser system as shown in FIG. 1D, for example. Light is input into the waveguide system in a $TE_{00}$ mode from a laser. A lens 450 and optical coupler 460 couple the $TE_{00}$ mode light from the laser into the waveguide core 410. Light from a laser is emitted in a crosstrack direction (x-direction) and has a 180 degree turn 435 that redirects the light in the opposite crosstrack direction. A second turn 445 directs the light normal to the media-facing surface of the read/write head where it is directed to a mode converter portion 420 of the waveguide 410. According to various implementations, the second turn 445 is about a 90 degree turn. Light enters the mode converter portion 420 in a main branch 422. A secondary branch 424 of the waveguide 410 combines with the main branch 422. After the mode converter portion 420, the mode converted light, e.g., substantially $TE_{10}$, light exits the waveguide and is coupled to an NFT at the ABS 415. While the waveguide systems described in FIGS. 3 and 4 are used in conjunction with specific laser configurations, it is to be understood that any of the mode converter waveguide systems described herein may be used in conjunction with any laser configuration.

Figure 5A:
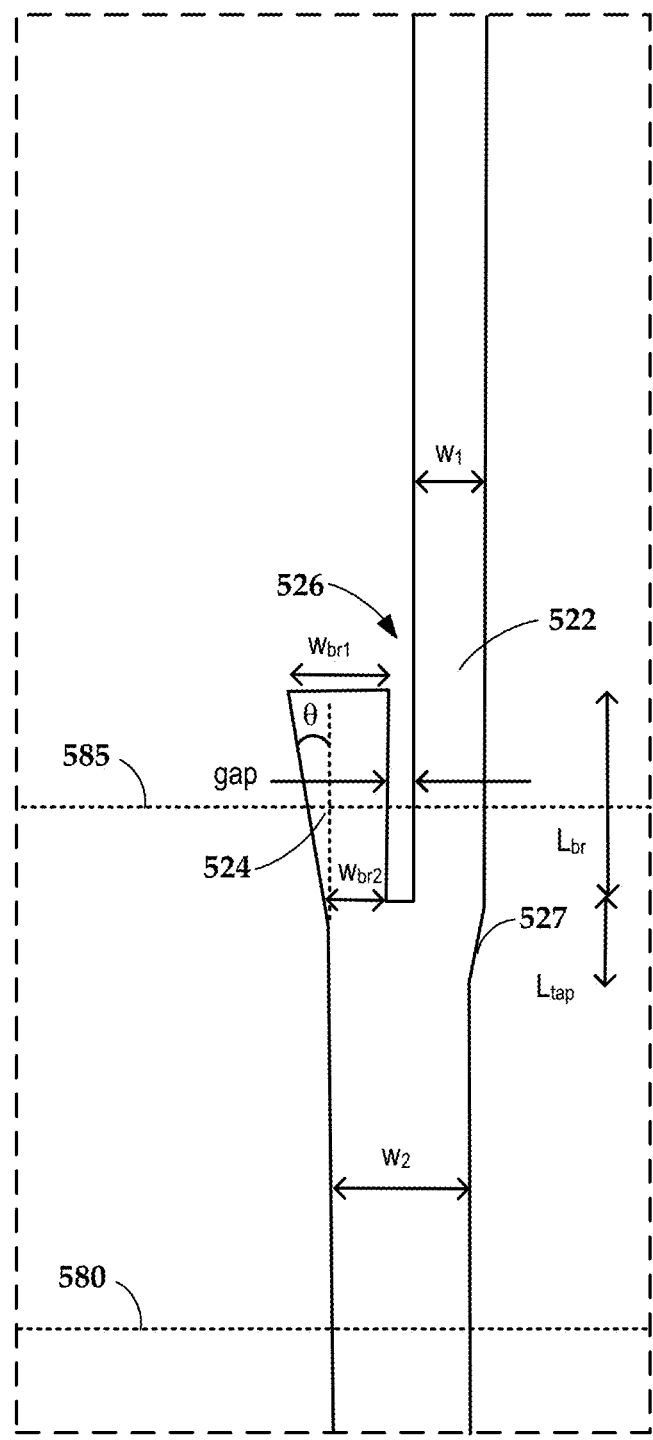
FIG. 5A illustrates a more detailed view of the mode converter portion of the waveguide in accordance with embodiments described herein.

FIG. 5A illustrates a more detailed view of the mode converter portion of the waveguide in accordance with embodiments described herein. The main branch 522 has a width ($w_1$) at the point before combining with the secondary branch 524. In some cases, $w_1$ may be in a range of about 350 nm to about 600 nm or in a range of about 400 nm to about 550 nm. According to some implementations, $w_1$ is about 440 nm. In some cases, $w_1$ remains constant until the main branch 522 combines with a secondary branch 524. According to various embodiments, $w_1$ varies along the length of the main branch 522. The secondary branch 524 has a starting width ($w_{br1}$) and a width ($w_{br2}$) at a point that the secondary branch 524 combines with the main branch 522. In some cases, $w_{br1}$ is in a range of about 600 nm to about 800 nm or in a range of about 630 nm to about 750 nm. According to various implementations, $w_{br1}$ is about 650 nm. The value of $w_{br1}$ may be the same as $w_{br2}$ or may be a different value than $w_{br2}$ in some cases. According to various embodiments, $w_{br2}$ is substantially the same as $w_1$. In some cases, $w_{br2}$ may be in a range of about 350 nm to about 600 nm or in a range of about 400 nm to about 550 nm. According to some implementations, $w_{br2}$ is about 440 nm. $w_{br2}$ may have substantially the same value as $w_1$ in some configurations. The secondary branch 524 may have a taper angle, θ in a range of 0.6 degrees to about 1.2 degrees.

A gap 526 may be disposed between the main branch 522 and the secondary branch 524 as illustrated in FIG. 5A. The various dimensions of the gap 526 may be tuned to achieve a desired and/or a maximum amount of mode conversion from $TE_{00}$ to $TE_{10}$. In some cases, the width of the gap 526 is constant for the entire length of the gap 526. The gap 526 may not have a constant width portion according to various configurations. For example, the width of the gap 526 may taper linearly or nonlinearly. According to various configurations, the width of the gap 526 is in a range of about 100 nm to about 200 nm or in a range of about 135 nm to about 170 nm. In some cases the width of the gap 526 is about 150 nm. The length of the gap is represented by $L_{br}$. $L_{br}$ may be in a range of about 9 μm to about 15 μm. In some cases, $L_{br}$ is about 12 μm.

Figure 5B:
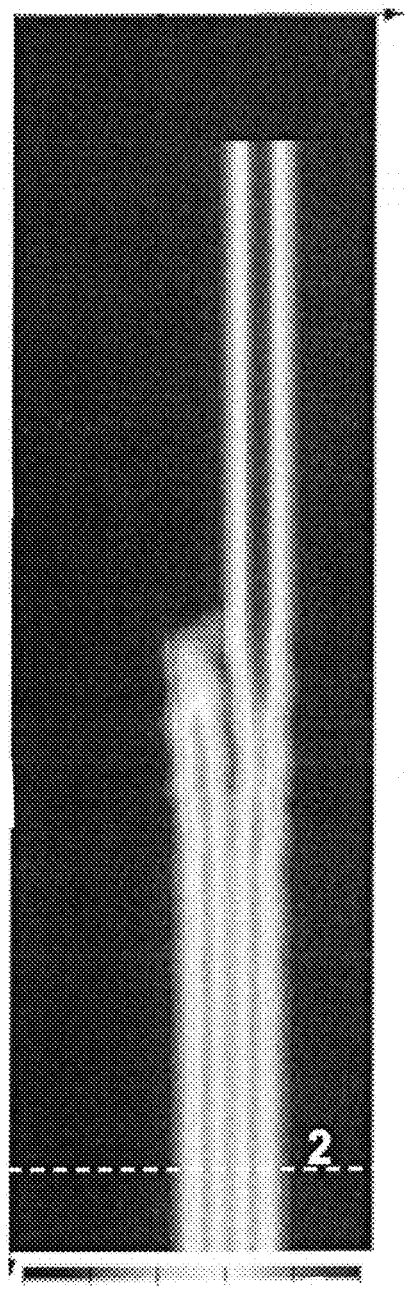
FIG. 5B illustrates a field plot at different sections of the mode converting waveguide in accordance with embodiments described herein.

The final width ($w_2$) of the combined main branch 522 and the secondary branch 524 may be equal, greater than, or less than the sum of the widths of the main branch 522, the secondary branch 524, and the gap width. One or both of the main branch 522 and the secondary branch 524 may have a taper to accommodate the change in width of the combined waveguide. In the example shown in FIG. 5A, the waveguide includes a tapered portion 527 that starts at the point where the waveguide branches are combined and continues to taper substantially linearly for a length ($L_{tap}$). $L_{tap}$ may be in a range of about 2 μm to about 8 μm. In some cases, $L_{tap}$ is about 5 μm. One or both of the main branch 522 and the secondary branch 524 may include the taper. While FIG. 5A shows a linear decreasing taper, it is to be understood that the taper may be non-linear and/or may increase along the light propagation direction. FIG. 5B is a field plot showing the electric field along the waveguide of FIG. 5A.

Figure 5C:
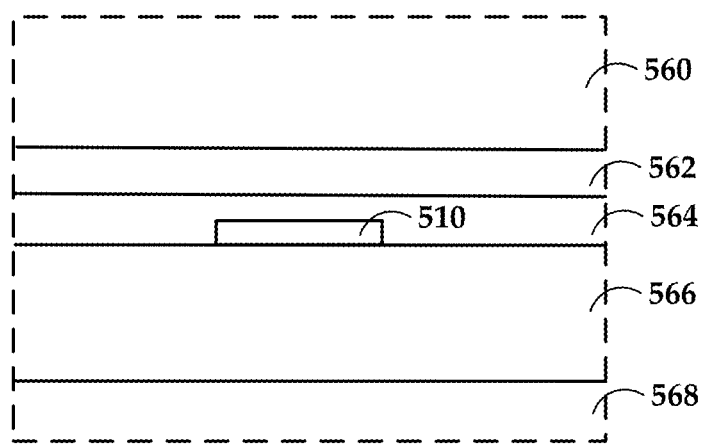
FIGS. 5C and 5D illustrate cross sectional views of the waveguide system of FIG. 5A in accordance with embodiments described herein.

FIG. 5C illustrates a cross sectional view of the waveguide system of FIG. 5A from the cut-line 580. The waveguide core 510 is surrounded by cladding layers 560, 562, 564, 566, 568. A first top cladding layer 560 has a thickness in the range of 0.3 μm to about 2 μm. A second top cladding layer 562 may have a thickness in a range of 0.1 μm to about 0.5 μm. In some cases the second top cladding layer 562 has a thickness of about 0.3 μm. A third top cladding layer may be in direct contact with the waveguide core 510 and may surround three sides of the waveguide core 510 as shown in FIG. 5C. In some cases, the third top cladding layer 564 has a thickness in the range of 70 nm to about 200 nm. FIG. 5C also shows a first bottom cladding layer 566 that is in contact with the waveguide core 510. The first bottom cladding layer 566 may have a thickness in a range of about 0.6 μm to about 1.0 μm. In some cases, the first bottom cladding layer 566 has a thickness of about 0.8 μm. A second bottom cladding layer 568 may have a thickness in a range of 0.4 μm to about 1 μm.

Figure 5D:
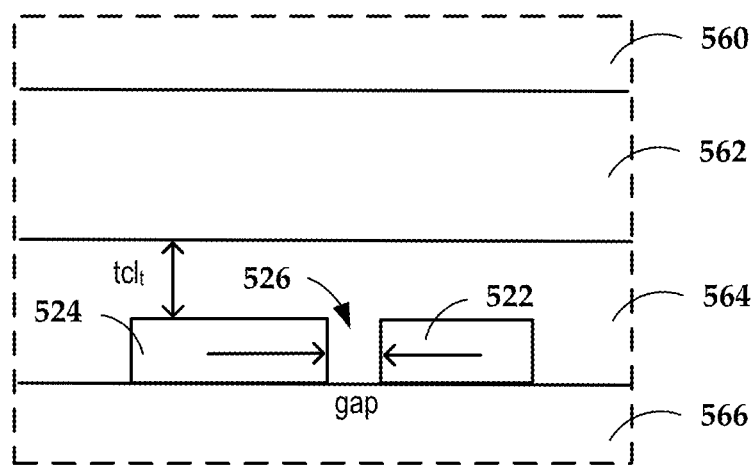
Figure 5E:
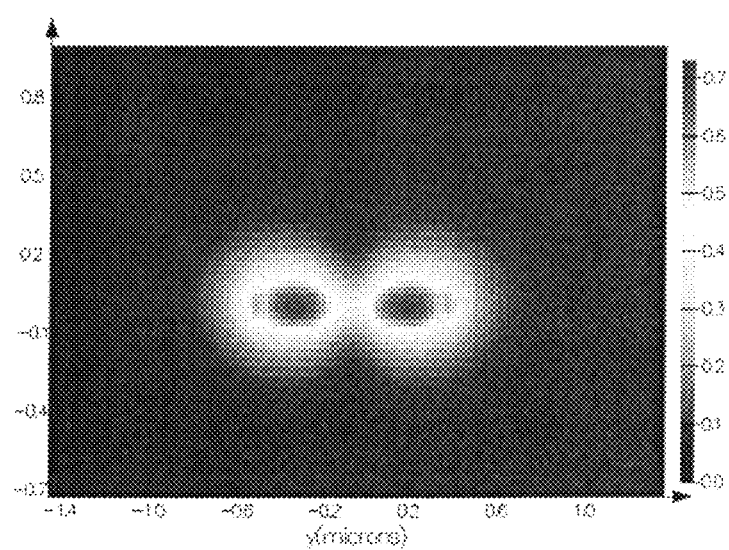
FIG. 5E illustrates a field plot at a cross section of the mode converting waveguide in accordance with embodiments described herein.

FIG. 5D illustrates a cross sectional view of the waveguide system shown in FIG. 5A from the cut-line 585. The view shown in FIG. 5D shows the main branch 522, the secondary branch 524, and the gap 526 disposed between the main branch 522 and the secondary branch 524. The third top cladding layer 564 has a thickness, $tcl_t$, between the waveguide core and the second top cladding layer 562. According to various embodiments, $tcl_t$ may be in a range of about 0.10 μm to about 0.16 μm. According to various embodiments, $tcl_t$ is about 0.13 μm, for example. FIG. 5E is a field plot illustrating the electric field in the cross section of the waveguide system.

Figure 6A:
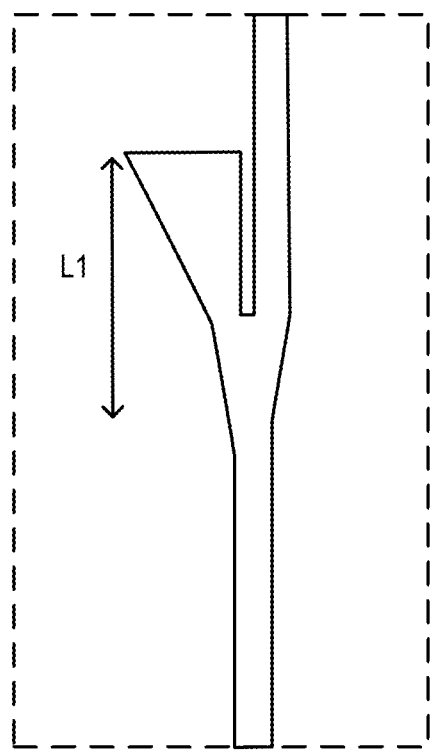
FIGS. 6A-6C illustrate various configurations for the mode converter portion of the waveguide in accordance with embodiments described herein.
Figure 6B:
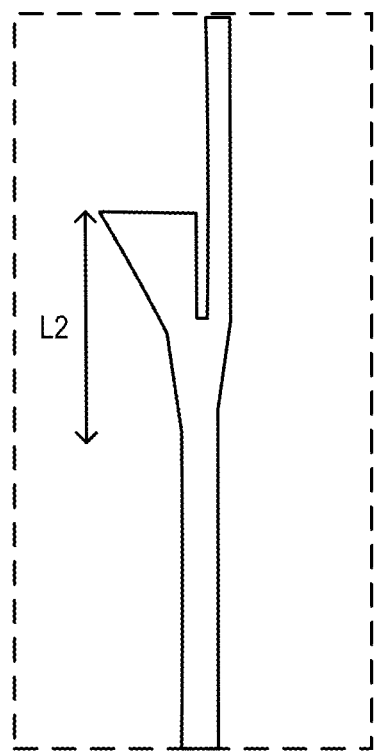
Figure 6C:
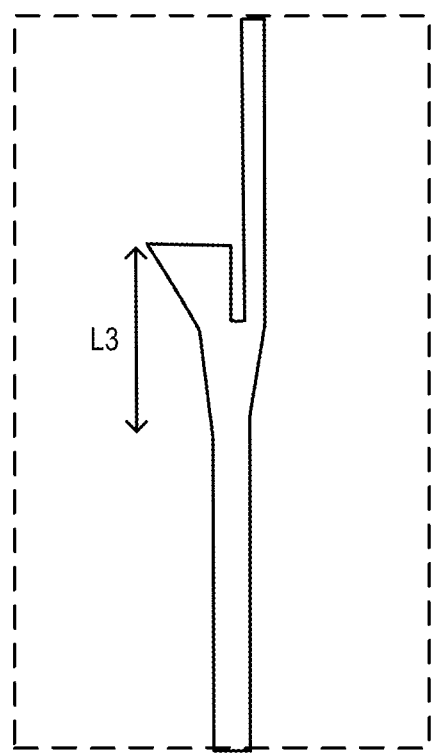

FIGS. 6A-6C illustrate various configurations for the mode converter portion of the waveguide in accordance with various embodiments described herein. Lengths L1, L2, L3 of the mode conversion regions of the waveguide may be in a range of about 12 μm to about 30 μm, for example. FIG. 6A shows an embodiment having a mode conversion region length, L1 of about 24 μm. In this example, $w_1$ substantially equals $w_{br2}$ and has a value in a range of about 538 nm to about 562 nm. In some cases, $w_1$ and $w_{br2}$ have a value of about 550 nm. The value of $w_{br1}$ has a range of about 725 nm to about 775 nm. In some cases, $w_{br1}$ is about 750 nm. The gap width may have a value of about 135 nm to about 165 nm. In some cases, the gap width is about 150 nm. According to various implementations, the $TE_{10}$ purity after the mode converter portion in this example is about 99.6% and the combined $TE_{00}$ and $TE_{10}$ mode after the mode converter portion is about 0.09%.

FIG. 6B shows an embodiment having a mode conversion region length, L2 of about 17 μm. In this example, $w_1$ substantially equals $w_{br2}$ and have a value in a range of about 422 nm to about 458 nm. In some cases, $w_1$ and $w_{br2}$ has a value of about 440 nm. The value of $w_{br1}$ has a range of about 620 nm to about 680 nm. In some cases, $w_{br1}$ is about 650 nm. The gap width may have a value of about 130 nm to about 170 nm. In some cases, the gap width is about 150 nm. According to various implementations, the $TE_{10}$ purity after the mode converter portion in this example is about 99.84% and the combined $TE_{00}$ and $TE_{10}$ mode after the mode converter portion is about 0.003%.

FIG. 6C shows an embodiment having a mode conversion region length, L3 of about 15 μm. In this example, $w_1$ substantially equals $w_{br2}$ and has a value in a range of about 386 nm to about 414 nm. In some cases, $w_1$ and $w_{br2}$ have a value of about 400 nm. The value of $w_{br1}$ has a range of about 605 nm to about 655 nm. In some cases, $w_{br1}$ is about 630 nm. The gap width may have a value of about 132 nm to about 168 nm. In some cases, the gap width is about 150 nm. According to various implementations, the $TE_{10}$ purity after the mode converter portion in this example is about 99.61% and the combined $TE_{00}$ and $TE_{10}$ mode after the mode converter portion is about 0.05%.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A write head comprising:
    an input coupler configured to receive light excited by a light source;
    a waveguide core configured to receive light from the input coupler at a fundamental transverse electric ($TE_{00}$) mode, the waveguide core comprising:
        a first straight portion extending from the input coupler;
        a mode converter portion comprising a branched portion extending from the first straight portion, the mode converter portion configured to convert the light to a higher-order ($TE_{10}$) mode, the mode converter portion separated from the input coupler by the first straight portion such that the mode converter is moved out of the input coupler; and
        a second straight portion between the mode converter portion and a media-facing surface, wherein the first straight portion has a length greater than that of the second straight portion; and
    a near-field transducer at the media-facing surface, the near-field transducer configured to receive the light at the $TE_{10}$ mode from the waveguide and direct surface plasmons to a recording medium in response thereto.

2. The write head of claim 1, wherein the branched portion is separated from at least part of the first straight portion by a gap for a predetermined length.

3. The write head of claim 2, wherein the gap has a substantially constant cross-sectional width.

4. The write head of claim 1, wherein the branched portion comprises a taper.

5. The write head of claim 1, wherein the second straight portion and the branched portion combine to form a predetermined combined width.

6. The write head of claim 5, wherein one or both of the second straight portion and the branched portion has a taper to accommodate the difference in the combined width.

7. The write head of claim 6, wherein the taper has a length in a range of about 2 μm to about 8 μm.

8. The write head of claim 1, wherein the mode converter portion has a length in a range of about 15 μm to about 24 μm.

9. The write head of claim 1, wherein the mode converter portion has a length of about 17 μm.

10. The write head of claim 1, wherein the light source comprises an active region formed a non-self supporting, crystalline layer transfer printed to a substrate of the write head.

11. The write head of claim 1, wherein the waveguide core is configured to receive the light emitted in a crosstrack direction from the light source.

12. The write head of claim 11, wherein the waveguide core comprises:
    a first turn that receives the light in the crosstrack direction redirects the light to an opposite crosstrack direction;
    a second turn that redirects the light to a direction normal to a media-facing surface of the write head;
    a first straight portion coupling the first and second turns; and
    a second straight portion between the second turn and the media-facing surface.

13. A write head comprising:
    an input coupler configured to receive light excited by a light source;
    a waveguide core configured to receive light from the input coupler at a fundamental transverse electric ($TE_{00}$) mode, the waveguide core comprising:
        an input portion extending from the input coupler and configured to receive light from the input coupler;
        a mode converter portion comprising a branched portion extending from the input portion, the mode converter portion configured to convert the light to a higher-order ($TE_{10}$) mode, the mode converter potion separated from the input coupler by the input portion such that the mode converter is moved out of the input coupler; and
        an output portion between the mode converter portion and a media-facing surface, wherein the input portion has a length greater than that of the output portion; and
    a near-field transducer at the media-facing surface, the near-field transducer configured to receive the light at the $TE_{10}$ to mode from the waveguide and direct surface plasmons to a recording medium in response thereto.

14. The write head of claim 13, wherein the mode converter portion comprises a main branch and a secondary branch, the main branch at least partially separated from the secondary branch by a by a gap for a predetermined length.

15. The write head of claim 14, wherein the gap has a substantially constant cross-sectional width.

16. The write head of claim 14, wherein the main branch and the secondary branch combine to form a predetermined combined width.

17. The write head of claim 16, wherein one or both of the main branch and the secondary branch has a taper to accommodate the difference in the combined width.

18. The write head of claim 17, wherein the taper has a length in a range of about 2 µm to about 8 µm.

19. The write head of claim 13, wherein the mode converter portion has a length in a range of about 15 µm to about 24 µm.

20. The write head of claim 13, wherein the mode converter portion has a length of about 17 µm.

21. The write head of claim 1, wherein the first straight portion has a length at least twice that of the second straight portion.

22. The write head of claim 13, wherein the input portion has a length at least twice that of the output portion.

* * * * *